United States Patent [19]

Olstowski

[11] 4,008,185

[45] Feb. 15, 1977

[54] PROCESS FOR PREPARING RAPID-SETTING POLYURETHANES

[75] Inventor: Franciszek Olstowski, Freeport, Tex.

[73] Assignee: The Dow Chemical Company, Midland, Mich.

[22] Filed: Mar. 29, 1974

[21] Appl. No.: 456,093

[52] U.S. Cl. .................. 260/2.5 AC; 260/77.5 AC; 260/75 NC
[51] Int. Cl.² ........................................ C08G 18/18
[58] Field of Search ............ 260/77.5 AC, 2.5 AC, 260/75 NC

[56] References Cited

UNITED STATES PATENTS

| | | |
|---|---|---|
| 3,446,771 | 5/1969 | Matsubayashi et al. ... 260/77.5 AC |
| 3,726,827 | 4/1973 | Jones et al. ........................ 260/37 N |
| 3,746,692 | 7/1973 | Olstowski et al. ................ 260/37 N |

Primary Examiner—M. J. Welsh
Attorney, Agent, or Firm—James G. Carter

[57] ABSTRACT

Rapid-setting polyurethanes are prepared from organic aromatic polyisocyanates and polyols having an average functionality of 2–8 and an equivalent weight less than 500 by admixture thereof in the presence of a non-amine nitrogen-containing compound such as urea as a catalyst therefor.

5 Claims, No Drawings

PROCESS FOR PREPARING RAPID-SETTING POLYURETHANES

This invention relates to a process for preparing rapid-setting polyurethanes.

Rapid setting polyurethanes are usually prepared by reacting a polyol and a polyisocyanate in the presence of a modifier compound and an organo-metallic catalyst such as the organo-metal carboxolates except that when an amine initiated polyol is employed, the catalyst is not required. Such methods and others are described in U.S. Pat. Nos. 3,378,511; 3,726,827; 3,746,692; 3,725,355; 3,753,933; and 3,773,697; and in copending applications Ser. No. 405,243, filed Oct. 10, 1973, titled "SOLID, RAPID-SETTING, RIGID POLYURETHANES," by Franciszek Olstowski; Ser. No. 405,244, filed Oct. 10, 1973; titled "SOLID, RAPID-SETTING, RIGID POLYURETHANES," by Franciszek Olstowski; Ser. No. 392,590, filed Aug. 29, 1973 abandoned in favor of Ser. No. 449,873, filed Mar. 11, 1974 abandoned in favor of Ser. No. 521,592 filed Nov. 7, 1974, titled "RAPID-SETTING POLYURETHANES" by Franciszek Olstowski; Ser. No. 392,591, filed Aug. 29, 1973, titled "RAPID-SETTING POLYURETHANES" by Franciszek Olstowski now U.S. Pat. No. 3,847,859; Ser. No. 366,835, filed June 4, 1973, titled "NON-ELASTOMERIC POLYURETHANE COMPOSITIONS" by Franciszek Olstowski and Donald B. Parrish; Ser. No. 358,245, filed May 7, 1973, titled "RAPID-SETTING POLYURETHANES FROM DIOLS AND POLYFUNCTIONAL ISOCYANATES" by Franciszek Olstowski now U.S. Pat. No. 3,801,532; Ser. No. 246,903, filed Apr. 24, 1972, titled "FLUID RAPID-SETTING URETHANE COMPOSITIONS" by Franciszek Olstowski and Donald B. Parrish. isocyanates It is known that amides and ureas can react with isocyanates upon prolonged heating (say, temperatures of 100° C or more for many hours)—see page 10 of Saunders and Frisch, Vol. I, also pages 67 and 190. Substituted ureas are known to catalyze the reaction between isocyanates and amines (see pages 176 and 177). Dimethyl formamide was tested as an ineffective catalyst for isocyanate and thiol reaction (see pages 202–203 of Saunders and Frisch, Vol. I). A summary of known catalysts promoting isocyanate reactions with amines, alcohols, water, carboxylic acids, etc., is listed on page 212 (ibid).

It has been unexpectedly discovered that amides, ureas (both free of phenyl substitution), and triazines and related compounds mentioned herein are effective catalysts for the reaction of aromatic polyisocyanates with low equivalent weight (less than 500, preferably less than 200) polyols.

The present invention is directed to a process for preparing polyurethanes which process comprises
1. admixing the components of a composition comprising
    A. A polyol free from nitrogen groups or mixtures of such polyols having from 2 to about 8 hydroxyl groups and an OH equivalent weight of from about 30 to about 500, preferably from about 30 to about 200;
    B. an organic aromatic polyisocyanate; and
    C. at least a catalytic quantity of a non-amine nitrogen-containing substance which does not react with or cause a reaction of an organic aromatic polyisocyanate at room temperature; wherein components (A) and (B) are present in quantities so as to provide an NCO:OH equivalent ratio of from about 0.8:1 to about 1.2:1, preferably from about 0.95:1 to about 1.05:1 with the proviso that when Component (A) has an average functionality of about 2, the average functionality of Component (B) is at least about 2.5;
2. placing the admixed composition into a suitable mold wherein said composition solidifies within less than about 15 minutes; and
3. subsequently removing the resultant article from the mold or container.

Suitable initiator compounds having from 2 to 8 hydroxyl groups which can be employed to prepare nitrogen-free polyols (Component A) which may be employed in the present invention include, for example, ethylene glycol, propylene glycol, 1,4-butane diol, 1,6-hexane diol, glycerine, trimethylolpropane, pentaerythritol, sorbitol, sucrose, phenols, bisphenols, novolac resins, mixtures thereof and the like.

Suitable vicinal epoxy compounds which may be reacted with the initiator compounds to prepare polyols which may be employed as Component (A) in the present invention include, for example, the lower alkylene oxides and substituted alkylene oxides such as ethylene oxide, 1,2-propylene oxide, 1,2-butylene oxide, 2,3-butylene oxide, epichlorohydrin, epibromohydrin, epidohydrin, styrene oxide, mixtures thereof and the like.

Suitable polyols free of nitrogen groups also include glycerine, trimethylolpropane, ethylene glycol, propylene glycol, mixtures thereof and the like.

Suitable organic aromatic polyisocyanates which can be employed herein as Component (B) include, for example, 2,4-toluene diisocyanate, 2,6-toluenediisocyanate, methylene diphenyl diisocyanate, polymethylene polyphenylisocyanates, bitolylene diisocyanate, 1,5-naphthalene diisocyanate, dianisidine diisocyanate, mixtures thereof, and the like.

Also suitable as the polyisocyanate Component (B) herein are the NCO-containing adducts of an aromatic polyisocyanate with a polyol as described above, said adducts having an NCO content of from about 10% to about 40%.

The term "organic, aromatic polyisocyanate" as employed herein is defined as those polyisocyanates wherein the NCO groups are attached directly to an aromatic or substituted aromatic ring.

Substances which can be employed as Component (C) herein are nitrogen-containing substances which are not amines. Since amines such as triethylenediamine, diethylene triamine 2,4-tolylene diamine, p,p'-methylene dianiline and the like react with organic aromatic polyisocyanates or cause a reaction of such isocyanates at room temperature, the nitrogen-containing substances which can be employed herein as the catalyst, Component (C), are defined as those nitrogen-containing substances which do not react with an organic aromatic polyisocyanate at room temperature within a period of about 15 minutes, as determined by an observable exotherm of a mixture of such substances at room temperature within the above-indicated time.

Suitable such non-amine nitrogen containing materials include amides and aliphatic substituted amides such as, for example, those containing up to about 20 carbon atoms per nitrogen atom including urea, biuret, triuret, formamide, acrylamide, dimethylformamide, N,N'-methylene bis-acrylamide, caprolactam; amide containing polymers such as, for example, Nylon 66, dicyandiamide and triazines such as, for example, melamine, cyanuric acid, and trimers of organic isocyanates such as 1,3,5-tris(3-isocyanato-4-methyl phenyl) 2,4,6-triazine (1H,3H,5H)trione.

The catalytic effect of these nitrogen containing materials are limited to the formation of polymers from the reaction of polyols with polyisocyanates:

A. If the polyol has an equivalent weight of less than about 500 and preferably less than about 200, and B. Only if the polyisocyanate is an aromatic polyisocyanate. Peculiarly enough, the abovementioned nitrogen containing organic compounds do not exhibit any substantial catalytic effect when the isocyanate reactant is of the aliphatic or cyclo-aliphatic type such as, for example, hexamethylene diisocyanate, isophorone diisocyanate, hydrogenated methylene diphenyl diisocyanate, and the like.

The N-containing (non-amine) organic catalytic modifiers described in this disclosure do not appear to react with the aromatic polyisocyanates at room temperature to any substantial degree. For example, tolylene diisocyanate can be blended with about 50 wt. % of caprolactam, acrylamide, urea or melamine for a period of about 15 to 30 minutes or more at room temperature with no detectable exotherm or substantial change in appearance of the blend. However, upon the addition of substantially stoichiometric amounts of a low equivalent weight polyol (i.e. a glycerinepropylene oxide adduct having an OH equivalent weight of about 87) to the above unreacted isocyanate blends causes an immediate exotherm to occur and results in a formation of a rigid polymer casting between about 30 seconds and 8 minutes after stirring in the polyol (depending on the particular modifier employed).

On the other hand, amines and particularly those that are known to be useful as urethane catalysts such as triethylene diamine (DABCO); triethyl amine; N,N'-dihydroxyethyl ethylene diamine; diethylene triamine; 2,4-toluene diamine; or p'p'-methylene dianaline when added to approximately equal mass of tolylene diisocyanate results in strong exotherm within a few minutes and generally results in a solid product that is essentially non-reactive to subsequent additions of a polyol.

Therefore, it is surprising that the nitrogen containing organic materials employed in the present invention (non-amines) do not react with aromatic isocyanates at any substantial rate at room temperature and are catalytically as effective, if not more so, than well known amine catalysts in promoting an aromatic polyisocyanate plus low equivalent weight polyol reaction at room temperature, without the requirement for the application of external sources of heat, and without the presence of a supplemental catalyst. However, if desired, such external heat sources and supplemental catalyst can be employed.

For instance, a blend of an 87 equivalent weight triol (an adduct of propylene oxide and glycerine) containing about 1 wt. percent of dissolved urea with a stoichiometric amount of tolylene diisocyanate when cast into a polyethylene beaker solidifies into a solid transparent resin in about 60 seconds after blending the reactants. The resin was capable of being removed from the mold in less than 3 minutes after admixture of the blend. When the urea catalyst was reduced to about 0.25 wt. (about 0.12 wt. percent based on total formulation) percent in the polyol (having an equivalent weight of about 87), then solidification after blending with toluene diisocyanate required about 5 minutes and a solid polymer casting was demolded in about 9 minutes after stirring in the reactants.

The amount of catalytic modifier added to the polyol and polyisocyanate reactants depends on the properties desired in the final polymer. When using a nitrogen containing (non-amine) compound that is a solid at room temperature, the amount of catalyzed modifier may range from about 0.1 wt. percent to about 50 weight percent of the total formulation. On the other hand, if the desired catalytic modifier is a liquid at room temperature (such as formamide or dimethyl formamide) then the amount of modifier used is less than about 30 wt. percent. Additional quantities of the liquid (at room temperature) catalytic modifiers yield a highly plasticized and undesirably weak polyurethane resin casting.

With a given polyisocyanate and polyol, each of the catalytic modifiers will exhibit a characteristic time interval of converting liquid polyol and polyisocyanate reactants to a solid polyurethane resin that appears to be relatively insensitive to the concentration of the catalytic modifier in the reactive blends. For example, a 0.125 weight percent urea in a blend of tolylene diisocyanate plus an 87 equivalent weight polyol adduct of propylene oxide and glycerine required about 5 minutes for solidification; then when the urea concentration was increased to about 33 percent of the total formulation the time required for solidification of this blend was about one minute. In other words a 260 fold increase in the concentration of the modifier exhibited only about a fivefold decrease in the solidication time. For a less active catalytic modifier such as dicyandiamide at a 1.6 wt. percent conc. in the same polyol and polyisocyanate reactants caused solidification to occur in about 8 minutes (reactants at room temperature) and when the dicyandiamide concentration was increased to 30 wt. percent of the formulation, the solidification time was about 7 minutes. Cyanuric acid (tricarbimide), one of the "slowest" catalytic modifiers will effect the solidification of the same polyol and polyisocyanate reactants (at room temperature) in about 12 minutes at a concentration of about 1.6 weight percent.

The blending of the catalytic modifiers that are liquids at room temperature present no problems (for example: formamide or dimethyl formamide) since these are very soluble in the polyol reactant. The catalytic modifiers that are solids at room temperature range from such substances as caprolactam which is very soluble in polyols (more than 10 wt. percent, say, an 87 equivalent weight triol resulting from the adduction of propylene oxide onto a glycerine initiator) to such substances as melamine, urea, and cyanuric acid which appear to dissolve less than about 5 weight percent in the sample polyol at room temperature. However, total solubility of the catalytic modifier in the polyol is not required. Therefore blending of the solid catalytic modifiers may be performed by the following methods:

A. Predissolving the catalytic modifier in the polyol if the catalytic modifier is sufficiently soluble.

B. Dispersing a sufficiently particulate form of the catalytic modifier in the liquid polyol, C. Dispersing the solid catalytic modifier in the liquid polyisocyanate, and D. Dispersing the catalytic modifier in preblended polyol plus polyisocyanate mixture.

The particle size of a relatively insoluble solid catalytic modifier can be important; the particles should pass thru at least 20 mesh (U.S. Standard) and preferably thru at least 100 mesh sieve (U.S. Standard).

Homogenous dispersion of insoluble amounts of the catalytic modifier may be assisted by the presence of surfactants such as, for example, a silicone oil or a sufficient amount of mixing until an exotherm is evident. After the onset of the exotherm (from about 10 seconds to about 2 minutes of mixing depending on the activity of the catalytic modifier) but prior to solidification of the reactants, the mixture will appear homogenized. Casting or dispensing of the reactive fluid blend into molds should occur after homogenization is observed.

The use of these catalytic modifiers to effect the polymerization of a low equivalent weight polyol with an aromatic isocyanate can exhibit some unique features. For example, glycerine does not exhibit any tendency to rapidly react with tolylene diisocyanate at room temperature when catalyzed with about 1 wt. % lead octoate. The problem appears to be that glycerine and tolylene diisocyanate are insufficiently soluble in each other. However, if caprolactam is dissolved in the glycerine, then this blend readily reacts with the toluene diisocyanate.

Furthermore, previous work had shown that rapidly reacting a low equivalent weight polyol with a polyisocyanate when catalyzed with a heavy metal carboxylate such as stannous octoate or lead naphthanate in the absence of a substantial amount of a liquid modifier such as dioctyl phthalate will yield an "instantly" solidifying resin mass which will subsequently develop fissures and uncontrolled swelling and distortion (unless quenched after solidification). Yet in the disclosed method of the present invention, the dissolving of carefully dried urea or caprolactam in minor amounts in the polyol does not exhibit the development of fissures and uncontrolled swelling when reacting a low equivalent weight polyol with a polyisocyanate (i.e. TDI) in the absence of substantial amounts of a liquid modifier.

As has been mentioned before, the nature or density of the resulting polyurethane resin catalyzed by the herein disclosed nitrogen containing (non-amine) compounds is dependent upon the nature of the substance to catalyze the polyol-polyisocyanate mixture. For example, most of these catalytic modifiers are hydrophilic to varying degrees and the sorbed water will react with the polyisocyanate with a resulting foamed or low density cellular product. Furthermore, if the powdered catalytic modifier is substantially free of sorbed water but the particulate modifier possesses a high surface area then this substance will also cause a foamed polyurethane to occur by virtue of the sorbed gases being desorbed durinng the polyurethane formation exotherm. However, if the catalytic modifier compound is carefully pre-dried and dissolved in the polyol (preferably under a vacuum at elevated temperatures) then the reacting mixture of polyol and polyisocyanate will exhibit no cellular formation and yield high density polyurethane castings.

Very low density cellular polyurethanes are useful as insulation materials; intermediate or high density cellular rigid polyurethanes are useful as cast furniture articles. High density non-cellular polyurethanes are useful as gears, tool handles, pipe fittings and general structural members.

Although it would appear that the catalytic modifiers employed in the present invention possess an active hydrogen atom attached to the nitrogen atom in the molecule, and thus be susceptible to reaction with the isocyanate group, the experimental evidence indicates that substantial reaction between the polyisocyanate and the catalytic modifier does not occur during the polyolpolyisocyanate reaction exotherm.

Optionally, a relatively minor amount of a heavy metal carboxylate may also be added to the formulation as a co-catalyst, particularly if it is desirable to speed up the solidification time (particularly with the "slower" catalytic modifiers such as cyanuric acid) or to increase the density of the resulting polymer by causing solidification to occur before full cellular expansion has taken place. Examples of these optional heavy metal carboxylate include, for example, stannous octoate, lead octoate, lead naphthanate, dibutyl tin dilaurate, lead oleate, mercury naphthanate, and antimony octoate. Lead octoate is particularly effective in this regard. The amount of optional co-catalyst may range from about .01 wt. % to about 2 wt. % of the total formulation. The preferred range is between about 0.1 wt. % and 1 wt. %.

Also optionally, a supplemental liquid or particulate solid modifier such as described in the U.S. Patents and co-pending application on page 1 of this application may also be added to the formulation. Reasons for adding a supplemental liquid modifier include the following:

A. A low viscosity liquid additive may be desired to lower the overall viscosity of the reactive blend.
B. Impart an opaqueness to the resulting cast resin.
C. Impart a controlled amount of flexibility to the resulting polymer.

Examples of optional liquid modifiers include polyethyl benzene, dioctyl phthalate, tall oil, tricresyl phosphate, or haloalkanes. Concentration of the above mentioned liquid modifiers can be from 0 to about 30 wt. % of the total formulation.

The supplemental liquid modifiers should exhibit no substantial chemical reaction with the polyol or polyisocyanate components of the reactive mix. Also, the supplemental liquid modifier should exhibit an atmospheric boiling point in excess of about 150° C if the resulting polymer is expected to have a density greater than about 1 gram per cubic centimeter except in those instances wherein said modifier is an aliphatic halocarbon which also contains hydroxyl groups.

Reasons for adding an optional particulate solid modifier includes the following:

A. Increased the viscosity of the reactive mix, and
B. Increase the surface hardness or flexural stiffness of the resulting polymer.

Examples of particulate solids used as supplemental additives include, for example, polyethylene powder, cellulose powder, bronze powder, zinc dust, silicon metal powder and the like. The concentration of solid additives may range from 0 wt. % to about 70 wt. % of the total formulation.

Generally, the addition of substantial amounts (i.e. more than about 10 wt. % of the total formulation) of the above mentioned optional additives will significantly increase the time required for solidification of the reaction mass compared to the same formulation in the absence of this optional additive.

Furthermore, optionally, a supplemental "blowing" or gas forming substance may be added to the reactive formulation if even lower density cellular polymer products are desired. Substances such as water, or a low boiling point liquid or a thermally decomposable inorganic hydrate may be added.

The catalytic modifiers may be used singly or as mixtures. For example, if the bulk property of the polymer casting requires the use of one of the "slower" catalysts, the speed of solidification of the formulation may be increased by the incorporation of one of the "faster" catalytic modifiers.

When casting or molding these reactive blends, it is preferred to use thin walled low heat capacity molds. A high thermal conductivity mold having a high thermal capacity (relative to the mass of the reactants charged) can seriously delay or even prevent proper or adequate polymerization of the reaction mass.

Examples of operable mold materials exhibiting low thermal conductivity include: Polypropylene, polyethylene, polytetrafluoroethylene, silicone elastomers, Mylar, or epoxy resins. High thermal conductivity metals such as copper, brass, aluminum, iron, nickel and alloys thereof are also operable if the mold is relatively thin walled. Metal molds having a high thermal capacity relative to the amount of reactive mix charged can also be used if these molds are preheated to temperatures in the range of, say 50° to 100° C.

The following examples are illustrative of the present invention.

EXAMPLE 1 — CATALYTIC AMOUNTS OF PRE-DRIED UREA

1 Wt. % urea was added to an 87 equivalent weight adduct of propylene oxide and glycerine, hereinafter referred to as G-PO-87. 70 Grams of this treated polyol were weighed out and to this were added 70 grams of 80/20 2,4-/2,6-tolylene diisocyanate (hereinafter referred to as 80/20 TDI). This mixture was rapidly stirred and in about 30 seconds this blend turned transparent. This blend was then poured into a Mylar tray. This liquid solidified into a transparent solid sheet about ¼ inch thick. In about 3 minutes after the start of blending the cast sheet was removed from the Mylar tray. When the cast sheet had cooled to room temperature, it was found to have a density greater than 1 g/cc and a Barcol hardness (No. 934-1 tester) value of about 45. This sheet was found to exhibit a tensile strength of 12,800 psi at an elongation of 9%.

EXAMPLE 2 — SAME CATALYST AS IN EXAMPLE 1 AND DIOCTYL PHTHALATE ADDED AS A SUPPLEMENTAL MODIFIER

To 50 grams of the above mentioned 1 wt. % urea in G-PO-87 was added 25 g of dioctylphthalate (DOP) and then was added 50 grams of 80/20 TDI. This rapidly stirred blend was then cast into a Mylar tray and within 5 minutes of stirring the mixture turned opaque and solidified. An opaque white sheet casting (approx. ¼ in. thick) was removed from the Mylar tray in about 10 minutes after start of stirring. After this sheet had cooled to room temperature, the Barcol Hardness on the No. 934-1 tester indicated a value of less than 2 and on the No. 935 tester the hardness value was found to be about 95.

A tensile specimen of this casting showed a tensile strength of 10,980 psi at an alongation of 10%.

EXAMPLE 3

| Same Catalytic Modifier, Added in Substantial Amounts | |
|---|---|
| The following was blended: | |
| 80/20 TDI | 60 g |
| Powdered urea | 40 g |
| G-PO-87 | 60 g |
| Dow Corning DC-192 surfactant | 3 g |

An exotherm was detected within 20 seconds after start of mixing of the above ingredients, then this blend was poured out into a Mylar tray after about 45 seconds of stirring. Solidification of this liquid mass was noted at about 70 seconds after start of stirring. In about 3 minutes the polymerized product was removed from the Mylar tray that cooled to a rigid opaque white casting.

COMPARATIVE EXPERIMENT A

| Blend of Same Polyol and Polyisocyanate in the Absence of Any Catalytic Modifier | |
|---|---|
| The following was blended: | |
| 80/20 TDI | 60 g |
| G-PO-87 | 60 g |

The above blend was cast into a 450 cc polyethylene beaker. Beaker contents were still liquid 7 minutes after mixing, 60 minutes after mixing, and 150 minutes after mixing. A very viscous liquid was found in the beaker 6 hours after mixing.

EXAMPLE 4

| Undried Urea Powder on Another Polyol | |
|---|---|
| The following was blended: | |
| Adduct of glycerine and ethylene oxide to an OH eq. wt. of 75 | 26 g |
| Urea powder (undried) | 10 g |
| 80/20 TDI | 30 g |

This mixture was stirred for about 90 seconds then cast into a 250 cc polyethylene beaker. This liquid blend foamed up and set in less than 2 minutes after stirring. The foam product was removed from the polyethylene beaker in about 3 minutes after mixing. This rigid foam polymer was found to have a density of about 0.37 g/cc.

EXAMPLE 5

| Undried Melamine Powder | |
|---|---|
| The following was blended: | |
| TDI | 30 g |
| Melamine powder (undried) | 1 g |
| G-PO-87 | 30 g |

The above mixture was rapidly stirred and an exotherm was detected about 2 to 3 minutes after start of stirring. This blend was then poured into a 250 cc beaker. This blend swelled due to bubble formation and the resulting foam structure solidified in about 6 to 8 minutes after mixing. A high density resin foam was demolded in about 12 minutes after start of stirring. This rigid foam product was found to have a density of about 0.49 g/cc.

EXAMPLE 6

| Higher Conc. of Undried Melamine Powder |
|---|
| The following was blended: |

EXAMPLE 6-continued

| Higher Conc. of Undried Melamine Powder | |
|---|---|
| 80/20 TDI | 30 g |
| G-PO-87 | 30 g |
| Melamine Powder | 8 g |
| Dow Corning DC-195 surfactant | 0.1 g |

This blend was cast into a 450 ml. polyethylene beaker. Foam rise of the reactants started about 2 minutes after start of mixing. End of foam rise occurred to about 5 minutes after start of mixing. The cast foamed resin was demolded about 12 minutes after start of mixing. The foamed polymer (rigid) was found to have a density of 0.21 g/cc.

EXAMPLE 7

| Use Trace Amount of Undried Formamide | |
|---|---|
| The following was blended: | |
| 80/20 TDI | 60 g |
| G-PO-87 | 60 g |
| Formamide (undried) | 0.2 g |

This blend was cast into a 450 ml. polyethylene beaker; the slightly expanded mass was found to solidify in about 7 to 8 minutes after the formamide addition. This hard high density foamed resin product was found to have a density of 0.76 g/cc (compare with comparative Experiment A).

EXAMPLE 8

| Undried "Catalytic" Amounts of Cyanuric Acid | |
|---|---|
| The following was blended: | |
| G-PO-87 | 30 g |
| Cyanuric acid powder (20 mesh U.S. Standard), undried | 1 g |
| 80/20 TDI | 30 g |

This blend was then cast into a 250 ml polyethylene beaker. An exotherm was detected at about the 3rd minute after blending and was followed by a foam rise of the reactants. The foam product had solidified by about the 12th minute after start of stirring. Maximum exotherm was greater than 120° C in the interior of the foam product. This rigid, tough white foam was found to have a density of about 0.38 g/cc.

EXAMPLE 9

| Predried Caprolactam Dissolved in G-PO-87 | |
|---|---|
| The following was blended: | |
| 80/20 TDI | 30 g |
| 40/60 wt. ratio of caprolactam/ G-PO-87 | 50 g |

This blend was cast into a 250 cc polyethylene beaker. It was observed that this fluid blend solidified in less than 3 minutes after the start of stirring. This casting was a tough, transparent, and dense polymer.

EXAMPLE 10 — OBSERVE LONG TERM CONTACT OF UREA, CAPROLACTAM, FORMAMIDE, AND CYANURIC ACID WITH 80/20 TDI

A. TDI + Urea

Thirty grams of 80/20 TDI were blended with 30 grams of urea powder. No exotherm was detected between the 2nd minute and the 28th minute after start of mixing. No solidification or gross change in appearance of this liquid slurry was observed during this 28 minute time interval. Then 30 grams of G-PO-87 was added to this mixture and within 40 seconds of admixing the G-PO-87 this blend exhibited an exotherm. About 90 seconds after blending in the polyol, the blend had solidified.

B. TDI and Caprolactam

Thirty grams of powdered caprolactam was stirred into 30 grams of 80/20 TDI. This liquid slurry showed no exotherm or other gross changes during the next 12 minutes. Then 30 g of G-PO-87 was stirred in and an exotherm was detected in about 25 seconds after stirring in the polyol. In about 120 seconds after stirring in the polyol this blended mass had solidified.

C. TDI and Formamide

Thirty grams of formamide was stirred into a 30 gram mass of 80/20 TDI. This mixture was stirred for 5 minutes with no sign of an exotherm occurring. No change in appearance or increase in viscosity of this fluid mixture was noted for 45 minutes after admixture. On the 46th minute, 30 grams of G-PO-87 were added to the blend and by the 48th minute a strong exotherm was detected. By the 49th minute this mixture had solidified.

D. TDI + Cyanuric Acid

To 30 g of 80/20 TDI was added 15 grams of cyanuric acid powder. No exotherm or change in viscosity was detected over a several minute intervals of stirring. About 22 hours later, no change was detected in the TDI-cyanuric acid slurry. Then 30 g. of G-PO-87 was added to the above blend and in about 14 minutes after stirring in the polyol, this mixture was found to solidify into a high density tough rigid foam. The density of this opaque white foam was found to be 0.63 g/cc.

COMPARATIVE EXPERIMENT B — Effect of Adding Substantial Amounts of Amines to Tolylene Diisocyanate

A. Addition of Powdered Triethylenediamine (TEDA) to 80/20 TDI

To 30 grams of TDI was stirred in 30 grams of powdered TEDA. In less than 3 minutes of contact, a strong exotherm was detected. In less than 10 minutes of contact, the reaction mass yielded a crumbly solid yellowish product. Then 30 g. of G-PO-87 was added to this crumbled solid mass and no exotherm and no reaction was detected between the G-PO-87 and the TDI reaction product.

B. Addition of Triethylamine to TDI

To 30 grams of 80/20 TDI was blended 30 g. of triethylamine. For less than 5 minutes of contact the liquid mass exhibited an exotherm and in less than 10 minutes this liquid mass had solidified. Then 5 minutes later, 30 grams of G-PO-87 was added to this solidified mass with no further exotherm or reaction with the G-PO-87 being apparent.

C. Addition of N,N'-Dihydroxyethylethylene Diamine to TDI

To 30 grams of 80/20 TDI was added of powdered N,N'-dihydroxyethylethylene diamine. For less than 3 minutes of contact a high exotherm was detected and then in less than 10 minutes this liquid slurry became solid. Twenty minutes later 30 grams of G-PO-87 was added to this reaction mass with no further exotherm or reaction with the G-PO-87 detected.

D. Addition of Diethylenetriamine (DETA) to TDI

To 30 g. of 80/20 TDI was added 10 g of DETA; in about 3 minutes a strong exotherm was noted which rapidly solidified.

E. 2,4-Tolylene Diamine

To 30 g of 80/20 TDI was added 30 g. of powdered 2,4-tolylene diamine. In about 60 seconds an exotherm was detected which resulted in a solid mass which showed no further reaction or exotherm upon the addition of 30 g of G-PO-87.

F. Addition of p,p'-Methylene Dianiline to TDI

To 30 g of 80/20 TDI was stirred in 30 g of powdered p,p'-methylene dianiline. An exotherm was noted within about 60 seconds. The resulting crumbly brittle mass showed no exotherm or reaction upon the addition of G-PO-87.

EXAMPLE 11 — Urea as a Catalytic Modifier

10 Grams of predried powdered urea was dispersed in 400 g of G-PO-87. Thirty grams of this mixture was then blended with 30 grams of 80/20 TDI. This mixture was cast into a polyethylene mold and was found to solidify in about 60 seconds after stirring in the TDI. Then about 3 ½ minutes after adding the TDI, a transparent, tough solid slug was removed from the polyethylene mold. This slug was found to have a density greater than 1 g/cc.

EXAMPLE 12 — Urea as Catalyst and Dioctylphthalate (DOP) as a Supplemental Modifier Thirty grams of the urea-G-PO-87 mixture prepared in Example 11 was blended with 30 grams of DOP. Then 30 grams of 80/20 TDI was mixed into this blend. This blend was then cast into an identical polyethylene mold used in Example 4. About 2 ½ minutes after mixing in the TDI, this blend slowly turned opaque white and solidified. In about 5 minutes after blending in the TDI, an opaque, white, tough solid was removed from the mold. This plastic product was found to have a density greater than 1 gram per cc.

EXAMPLE 13 — Urea Catalyzed G-PO-87 + Polyethylbenzene as a Supplemental Modifier To 30 grams of the urea-G-PO-87 mixture prepared in Example 11 was added 15 grams of a polyethylbenzene mixture (boiling point >150° C) and then to this mixture was added 30 grams of 80/20 TDI. About 5 minutes after casting this mixture into a polyethylene beaker a solid slug polymer was removed from the polyethylene mold and was found to have a density greater than 1 gram/cc.

EXAMPLE 14 — Tall Oil as Supplemental Modifier

To 30 grams of the urea + G-PO-87 mixture prepared in Example 11 was added 20 grams of tall oil. Next, 30 grams of 80/20 TDI was stirred in. The cast mixture polymerized into a solid slug which was removed from the polyethylene mold in about 5 minutes after mixing in the TDI. This cast slug had a density greater than 1 gram/cc.

EXAMPLE 15 — Tricresyl Phosphate as a Supplemental Modifier

To 30 grams of the urea + G-PO-87 mixture prepared in Example 11 as stirred in 15 grams of tricresyl phosphate. Next, 30 grams of 80/20 TDI was blended into the mixture. This cast mixture then solidified and a polymeric slug was removed from the polyethylene mold in about 5 minutes after blending in the TDI. This transparent plastic slug had a density of 1.2 g/cc.

Comparative EXPERIMENT C — Inoperable Aliphatic Polyisocyanates

A. Hexamethylene diisocyanate (HMDI)

To 30 grams of the urea + G-PO-87 mixture prepared in Example 11 was added 15 grams of tricresyl phosphate, then 30 grams of HMDI was blended in. This mixture was cast into a polyethylene mold. About 40 minutes after blending in the HMDI, this mixture was still a liquid with no sign of any exotherm taking place. Four hours later this mixture was still found to be a liqui- and six hours after the HMDI addition this mixture was still found to be a pourable liquid.

B. Isophorone Diisocyanate

To 30 grams of the urea + G-PO-87 mixture prepared in Example 11 was added 42 grams of isophorone diisocyanate. This blend was then cast into a polyethylene mold. One hour later this mixture had not yet solidified; 4 hours later this mixture was still found to be a pourable liquid.

C. Hylene W

To 30 grams of the urea + G-PO-87 mixture prepared in Example 11 was added 45 grams of Hylene W. This blend was stirred for about 2 minutes and then cast into a polyethylene beaker; two hours later this mixture had not yet solidified.

COMPARATIVE EXPERIMENT D

| An Inoperable Aromatic-Substituted Urea as a Catalytic Modifier | |
|---|---|
| The following was blended: | |
| TDI | 30 g |
| Powdered diphenyl urea | 10 g |
| G-PO-87 | 30 g |

This liquid blend was then cast into a polyethylene beaker. Twenty-five minutes after blending, this mixture was still liquid. This blend was a viscous liquid at 40 minutes after start of mixing. About 1 ½ hours after mixing this blend was still a viscous liquid.

COMPARATIVE EXPERIMENT E — An Inoperable Polyol —too High Eq. Wt.

A. Formamide as the Catalytic Modifier

20 Grams of TDI plus 110 grams of a glycerine-propylene oxide adduct having an OH equivalent weight of about 500 (G-PO-500) plus 10 grams of formamide were blended. This blend was then cast into a 250 ml polyethylene beaker. After one hour standing at room temperature, this mixture was still liquid. After the second hour, this blend was still liquid. The casting was not yet cured or demoldable at the end of the 4th hour.

B. Urea as the Catalytic Modifier

Blended 5 grams of powdered urea with 110 grams of G-PO-500 and to this was added 20 grams of TDI. This blend was cast into a polyethylene beaker and 1 hour after blending this mixture was found to still be a pourable liquid. At the end of two hours this blend was still a tacky very viscous liquid.

EXAMPLE 16 — Acrylamide (Predried) on the Catalytic Modifier

Forty grams of predried acrylamide were dissolved in 400 grams of G-PO-87 and then 60 grams of this solution were blended with 90 grams of polymethylene polyphenylisocyanate (PAPI) having an average functionality of about 2.7 and an average NCO equivalent weight of about 133. This blend was cast into a Mylar tray; this blend solidified in about 5 minutes after blending the reactants. This rigid cast sheet was found to have a density greater than 1 gram/cc and a Barcol hardness (No. 934-1 tester) value of about 50. This plastic sheet exhibited a tensile strength of 13,600 psi at an elongation of 16%.

EXAMPLE 17 — Caprolactam (predried) as a Catalytic Modifier

200 Grams of Predried Caprolactam were dissolved in 300 grams G-PO-87 and then 40 grams of this solution were blended with 40 grams of PAPI. This blend was then poured out into a Mylar tray and solidification was observed in less than 60 seconds after PAPI addition. A polymeric sheet was demolded in about 2 minutes after the PAPI addition. This rigid polymeric sheet had a density greater than 1 gram/cc and a Barcol hardness (No. 934-1 tester) value of 10 to 20.

EXAMPLE 18

| Undried Dicyandiamide as a Catalytic Modifier | |
|---|---|
| The following were blended: | |
| G-PO-87 | 30 g |
| Dicyandiamide powder (undried) | 25 g |
| 80/20 TDI | 30 g |

This blend was poured into a 250 cc polyethylene beaker. An exotherm was detected in this mixture in about 2 minutes after start of blending. This blend then foamed and rose and finally set 2 minutes after start of blending. This blend then foamed and rose and finally set about 7 minutes after the start of stirring. Interior exotherm was found to be in excess of 130° C at the 7th minute after the start of blending. After cooling to room temperature (no supplemental heat added to the polymerizing mass), the polymer product was found to be a high density rigid white foam (0.4 g/cc).

EXAMPLE 19

| Reduced Conc. of Dicyandiamide (Undried) | |
|---|---|
| The following were blended: | |
| G-PO-87 | 30 g |
| Dicyandiamide | 5 g |
| 80/20 TDI | 30 g |

This blend was poured into a 250 cc polyethylene beaker; this blend foamed and set by the 6th minute after stirring. Maximum exotherm of the foam interior was in excess of 140° C. Ten minutes after the start of stirring a high density (0.4 g/cc) rigid foam product was removed from the polyethylene mold.

EXAMPLE 20

| Further Reduced Conc. of Dicyandiamide (Undried) | |
|---|---|
| The following were blended: | |
| G-PO-87 | 30 g |
| Dicyandiamide (undried) | 1 g |
| 80/20 TDI | 30 g |

Poured this blend into a 250 cc polyethylene beaker. By the 8th minute after start of mixing, this blend had foamed and set showing an interior exotherm temperature of about 150° C. This rigid foam product was found to have a density of 0.55 g/cc.

EXAMPLE 21 — Diphenylmethane Diisocyanate

To a prestirred blend of 40 g G-PO-87 and 10 g of cyanuric acid powder (undried) was added 60 g of molten diphenyl methane diisocyanate. A strong exotherm was detected about 2 minutes after blending in the diisocyanate. This blend had foamed and solidified by the 12 th minute after addition of the diisocyanate. Maximum exotherm temperature of the interior of the foamed product was found to be in excess of 150° C. The cooled product was found to be a tough foam having a density of about 0.5 g/cc.

EXAMPLE 22 — Silicon Metal Powder as A Supplemental Modifier

To 30 grams of 80/20 TDI was added 60 grams of silicon metal powder (−325 mesh, surface area of 0.6 m²/gram) and then to this stirred mixture was added 30 g of G-PO-87 containing 2.5 wt. % of predried urea. This blend was poured into a 250 cc polyethylene beaker and within 4 minutes after adding the polyol this blend foamed, swelled in volume about twofold and set. This rigid microcellular foam product was found to have a density of 1.3 grams per cc.

EXAMPLE 23 — Octafunctional Polyol

Dissolved 50 grams of undried urea in 450 g of sucrosepropylene oxide adduct having an equivalent weight of about 162; then to 60 grams of this mixture was added 30 grams of 80/20 TDI. This stirred blend was then poured into a 450 cc polyethylene beaker. This blend then rapidly foamed and solidified in less than 75 seconds after stirring in the TDI. A rigid cellular polymer product was removed from the mold in about 3 minutes after blending in the TDI. The density of this foam was found to be about 0.5 g/cc.

EXAMPLE 24 — 1:1 Equivalent Weight Ratio of Polyol and Polyisocyanate

Dissolved 200 g of predried caprolactam in 300 g of G-PO-87, then added 50 grams of this solution to 30 grams of 80/20 TDI (approximately 100 Index). Poured this blend into a 250 cc polyethylene beaker and observed solidification to occur in less than 3 minutes after stirring in the TDI. This product was a tough, transparent, and dense polymer. Toughness was gauged by sharply bouncing this cast slug on the floor several times without this slug shattering or chipping.

Comparative EXPERIMENT F — Same Reactants as above but run at about 133 Index (NCO:OH eq. ratio =1.33:1)

Blended 50 grams of the caprolactam/G-PO-87 solution prepared in Example 24 with 40 grams of TDI. Poured this blend into a 250 cc polyethylene beaker and observed that solidification did not occur in less than 6 minutes after TDI addition. Finally when this blend solidified, the resulting polymer was found to be brittle and weak; sharply bouncing this cast slug on the floor resulted in shattering this slug.

COMPARATIVE EXPERIMENT G — Same Reactants as in Example 24, but run at a 166 Index.

Blended 50 grams of the caprolactam/G-PO-87 solution prepared in Example 25 with 50 grams of 80/20 TDI. Poured this blend into a 250 cc polyethylene beaker. This blend was observed to be still a pourable liquid about 12 minutes after mixing in the TDI. About 24 hours later a solid slug was removed from the mold. This solidified polymer was found to be extremely weak and brittle. This cast slug would not bounce off the floor, it shattered on impact.

Comparative Experiments F and G show that polymerizing these mixtures at indexes substantially above 100 (with respect to polyol plus polyisocyanate) yields reactive mixes that require much longer cure periods and yields a greatly weakened polymer.

EXAMPLE 25

Optional Use of a Heavy Metal Carboxylate Catalyst

| The following were blended: | |
|---|---|
| 80/20 TDI | 50 g |
| Melamine powder (undried) | 100 g |
| Dow Corning DC-195 | 0.5 cc |
| G-PO-87 | 50 g |
| Lead Octoate | 1 cc |

This mixture was cast into a Mylar tray; sudden solidification occurred in less than 30 seconds after catalyst (lead octoate) addition. An opaque white rigid casting wad demolded having a density of >1 gram/cc. This casting showed a Barcol hardness (934-1 tester) of 20 to 25 and possessed a tensile strength of 3187 psi at a 3% elongation.

EXAMPLE 26

Glycerine Plus Caprolactam

| Blended the following: | |
|---|---|
| 80/20 TDI | 30 grams |
| Glycerine | 10 grams |
| Caprolactam powder (undried) | 35 grams |

Stirred for about 30 seconds and then poured this mixture into a 250 cc polyethylene beaker. A high density rigid foam product was removed from the beaker in about 6 minutes after stirring the ingredients. The density of this foam product was 0.57 grams/cc.

COMPARATIVE EXPERIMENT H (Same as Example 26, without catalyst)

| Blended the following: | |
|---|---|
| 80/20 TDI | 30 grams |
| Glycerine | 10 grams |

Stirred this blend for at least 60 seconds and then poured this mixture into a 250 cc polyethylene beaker. This mixture was still liquid 15 minutes after start of mixing. Twenty-four hours after start of mix, the reactants were still liquid.

EXAMPLE 27

TDI Trimer (a Triazine) as Catalyst

| Blended the following: | |
|---|---|
| TDI | 30 grams |
| G-PO-87 | 30 grams |
| Powdered TDI trimer | 10 grams |

Stirred this blend for about 2 minutes and noted that an exotherm was occurring. Poured this mixture into a 250 cc polyethylene beaker. This mixture formed a foam; the foam product was demolded in about 12 minutes after start of stirring. Density of the foam was 0.24 g/cc.

I claim:

1. A process for preparing polyurethanes which comprises
   1. admixing the components of a composition comprising
      A. a polyol free from nitrogen groups or mixture of such polyols having from 2 to about 8 hydroxyl groups and an OH equivalent weight of from about 30 to about 200;
      B. an organic, aromatic polyisocyanate, and
      C. at least a catalytic quantity of a triazine which does not react with or cause a reaction, at room temperature, of an organic aromatic polyisocyanate; wherein components (A) and (B) are present in quantities so as to provide an NCO:OH equivalent ratio of from about 0.8:1 to about 1.2:1, with the proviso that when Component (A) has an average functionality of about 2, then Component (B) has an average functionality of at least about 2.5;
   2. placing the admixed composition into a suitable mold or container wherein said composition solidifies within less than about 15 minutes; and
   2. subsequently removing the resultant article from the mold or container.

2. The process of claim 1 wherein the NCO:OH equivalent ratio is from about 0.95:1 to about 1.05:1.

3. The process of claim 1 wherein Component (A) is an adduct of glycerine and propylene oxide and Component (B) is toluene diisocyanate.

4. The process of claim 2 wherein Component (C) is a trimer of an organic diisocyanate, isocyanuric acid or mixtures thereof.

5. The process of claim 2 wherein Component (C) is melamine.

* * * * *

UNITED STATES PATENT AND TRADEMARK OFFICE
CERTIFICATE OF CORRECTION

PATENT NO. : 4,008,185
DATED : February 15, 1977
INVENTOR(S) : Franciszek Olstowski It is certified that error appears in the above–identified patent and that said Letters Patent are hereby corrected as shown below:

Col. 16, line 54, Claim 3, "Claim 1" should read --Claim 2--.

Signed and Sealed this fifth Day of July 1977

[SEAL]

Attest:

RUTH C. MASON
*Attesting Officer*

C. MARSHALL DANN
*Commissioner of Patents and Trademarks*